US005307865A

United States Patent [19]

Inagaki et al.

[11] Patent Number: 5,307,865

[45] Date of Patent: May 3, 1994

[54] ENGINE OIL COOLING SYSTEM

[75] Inventors: Takashi Inagaki; Tokuji Yoshimoto; Michio Okubo; Kouji Okazaki; Tsugio Ikeda, all of Saitama, Japan

[73] Assignee: Honda Giken Kogyo Kabushiki Kaisha, Tokyo, Japan

[21] Appl. No.: 959,462

[22] Filed: Oct. 9, 1992

Related U.S. Application Data

[60] Continuation of Ser. No. 621,347, Dec. 3, 1990, abandoned, which is a division of Ser. No. 401,473, Aug. 29, 1989, Pat. No. 4,995,448, which is a continuation of Ser. No. 149,586, Jan. 28, 1988, abandoned.

[30] Foreign Application Priority Data

Feb. 6, 1987 [JP] Japan ............................... 62-024742
Mar. 13, 1987 [JP] Japan ............................... 62-056701

[51] Int. Cl.[5] ...................... F01P 11/08; B62D 61/02; B61D 27/00

[52] U.S. Cl. ........................................ 165/41; 165/44; 165/51; 165/916; 180/229; 184/104.1; 123/196 AB

[58] Field of Search ..................... 165/41, 44, 51, 916, 165/38, 37, 36, 35; 123/196 AB, 41.33; 184/6.22, 104.1, 104.3; 137/599.1, 89; 180/229

[56] References Cited

U.S. PATENT DOCUMENTS

| | | | |
|---|---|---|---|
| 1,617,433 | 2/1927 | Beisel . | |
| 1,918,471 | 7/1933 | Hawkins . | |
| 2,068,973 | 1/1937 | Booth | 137/165 |
| 2,070,092 | 2/1937 | Ramsaur | 123/196 |
| 2,222,721 | 11/1940 | Ramsaur et al. | 257/245 |
| 2,317,427 | 4/1943 | Worth | 137/144 |
| 2,460,754 | 2/1949 | Kidd | 257/2 |
| 2,489,136 | 11/1949 | Hoffstrom | 137/78 |
| 2,511,084 | 6/1950 | Shaw | 165/916 |
| 2,730,083 | 1/1956 | Kremser | 123/41.33 |
| 3,213,930 | 11/1965 | Robinson | 165/38 |
| 3,353,590 | 11/1967 | Holman | 165/35 |
| 3,877,514 | 4/1975 | Beck | 137/493 |
| 4,399,774 | 8/1983 | Tsutsumi | 123/41.1 |
| 4,426,965 | 1/1984 | Patel | 123/196 |
| 4,632,206 | 12/1986 | Morinaka et al. | 165/41 |
| 4,640,341 | 2/1987 | Ozawa | 165/51 |
| 4,673,032 | 6/1987 | Hara et al. | 165/44 |
| 4,690,236 | 9/1987 | Shinozaki et al. | 180/219 |
| 4,696,339 | 9/1987 | Schwartz | 165/51 |

FOREIGN PATENT DOCUMENTS

| | | | |
|---|---|---|---|
| 1020213 | 11/1957 | Fed. Rep. of Germany . | |
| 3446453 | 7/1986 | Fed. Rep. of Germany . | |
| 585151 | 2/1925 | France . | |
| 0120029 | 10/1978 | Japan | 123/196 AB |
| 0140033 | 10/1979 | Japan | 184/104.1 |
| 55-46008 | 3/1980 | Japan . | |
| 55-112818 | 9/1980 | Japan . | |
| 56-105613 | 8/1981 | Japan . | |
| 61-279728 | 12/1986 | Japan . | |

*Primary Examiner*—John K. Ford
*Attorney, Agent, or Firm*—Lyon & Lyon

[57] ABSTRACT

The inlet and outlet passages communicating with a water-cooled engine oil cooler for a vehicle, such as a motorcycle, are arranged for bypass of a regulated amount of oil from the inlet passage to the outlet passage to enhance the flowability of the cooled oil. Provision is made for a replaceable flow control orifice between the oil inlet and outlet passages to regulate oil viscosity. Also described is an arrangement providing for mounting the cooler to the crankcase or oil pan surface whereby air flowing past the cooler during movement of the vehicle assists the effects of the cooling liquid.

4 Claims, 3 Drawing Sheets

FIG. 1.
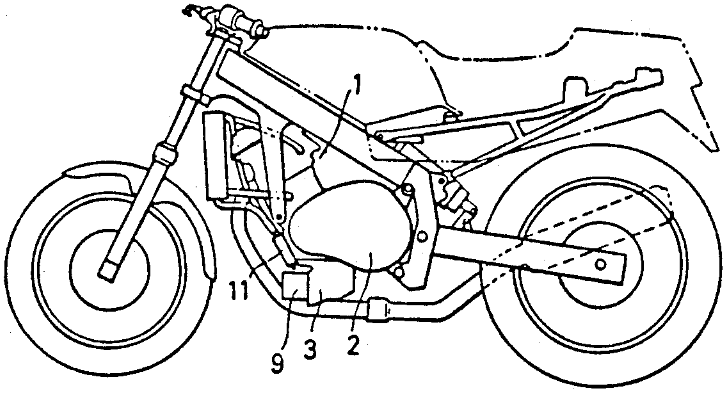
FIG. 2.
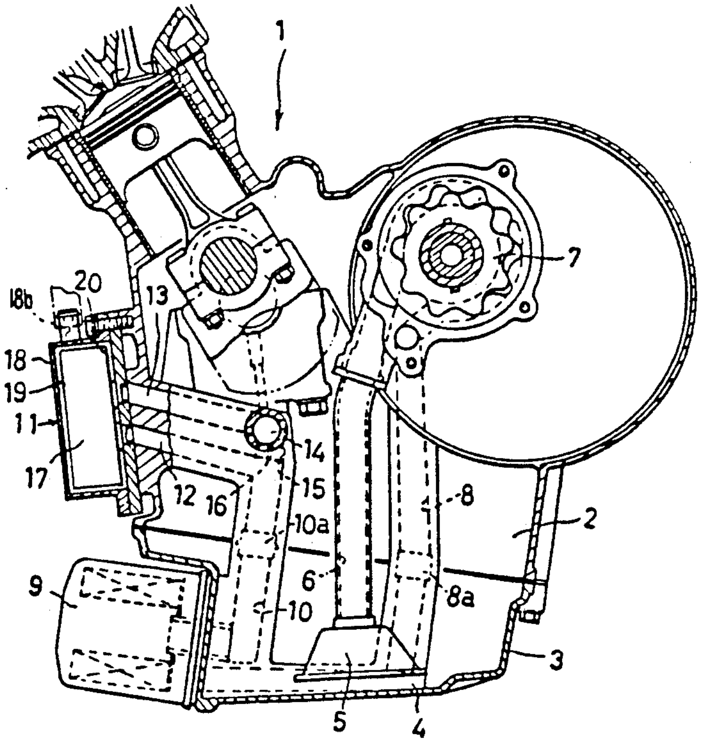
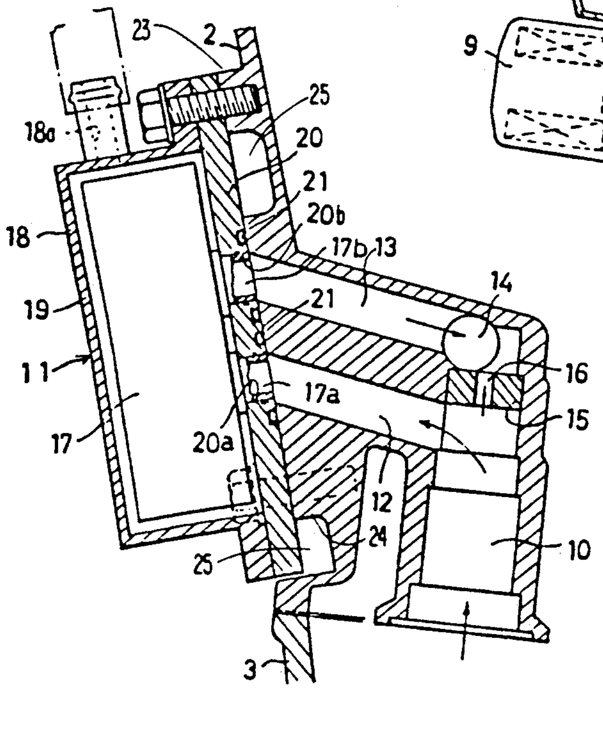
FIG. 3.

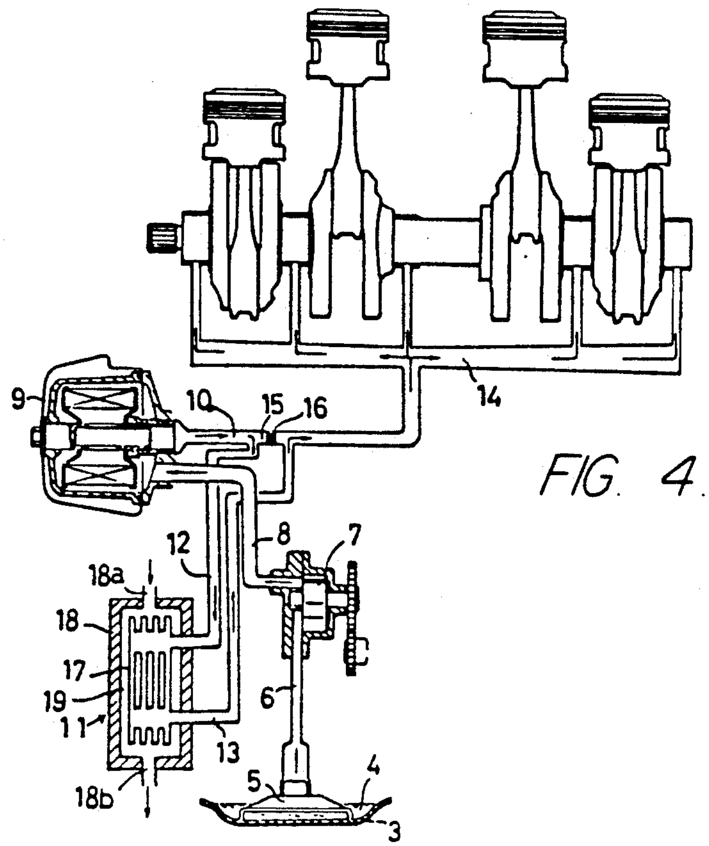
FIG. 4.
FIG. 5.
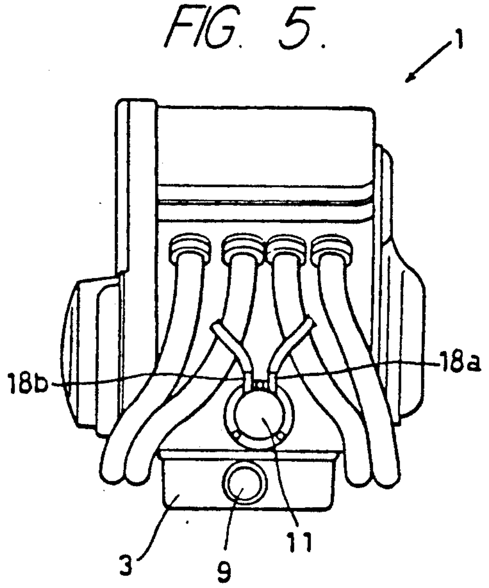
FIG. 6.
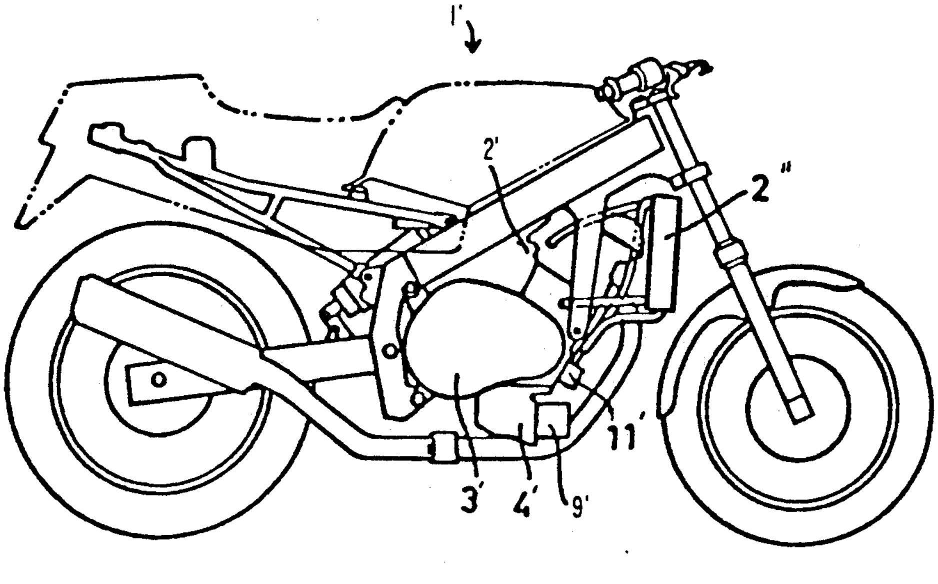

ENGINE OIL COOLING SYSTEM

This application is a continuation of Ser. No. 621,347, filed Dec. 3, 1990 now abandoned which is a divisional of application Ser. No. 401,473, filed Aug. 29, 1989 now U.S. Pat. No. 4,995,448, which is in turn a continuation of application Ser. No. 149,586, filed Jan. 28, 1988 now abandoned.

BACKGROUND OF THE INVENTION

The present invention relates to a system for cooling engine oil in a vehicle such as a motorcycle. More particularly, the invention relates to an arrangement for controlling the flowability of oil discharged from a water-cooled oil cooler provided integrally with a crankcase of a vehicle engine.

In the prior art an oil cooling system employing water as the cooling fluid is described in Japanese Utility Model Laid-Open No. 56-105613 (No. 104513/1981). The described system is generally constituted such that engine oil is pumped from an oil pan by an oil pump which operatively connects to the engine crankshaft and is then passed to an oil filter and fed under pressure to an oil cooler mounted integrally with the engine. Engine oil so-fed to the oil cooler is thereafter supplied, after cooling to an appropriate temperature, to the several vehicle parts to be lubricated.

In such oil cooling device, engine oil, being at a low temperature when the engine is started, especially in cold regions, increases in viscosity, whereby the load on the oil pump is increased and the power requirements for driving the engine are increased. In the light of such a problem, it is an object of the present invention to provide a cooling system for cooling engine oil in which the oil inlet and outlet passages communicating with an oil cooler of the water cooled type are interconnected by a bypass flow passage containing an orifice, whereby, if the viscosity of the discharge oil from the cooler increases beyond an acceptable limit due to subjecting either the inlet oil or the cooling liquid to excessively low ambient temperatures and the pressure required to be produced by the oil pump to pump the oil is excessively increased, the viscosity of the engine oil can be regulated to remain within an acceptable range.

In order to attain the aforesaid object, the present invention provides a system for cooling engine oil in which a water-cooled oil cooler is provided integrally in the flow passage for engine oil connecting each of the engine parts to be lubricated with a storing portion for engine oil provided by the engine crankcase characterized in that a bypass flow passage is provided between the inlet and the outlet passages for the engine oil that communicate with the oil cooler so as to interconnect the two passages. Advantageously, the bypass flow passage may be provided with an orifice.

SUMMARY OF THE INVENTION

According to the present invention a cooling system for a vehicle in which the cooler is water-cooled and is provided with an oil bypass arrangement interconnecting the oil inlet passage and the oil outlet passage to the cooler whereby the viscosity and, hence, the flowability of the oil being pumped through the system can be regulated. The bypass connection is adapted to contain a replaceable flow control orifice for accommodating the temperature conditions of different operating regions.

In a modified form the oil cooler can be fixedly mounted to the engine crankcase or oil pan to permit air flowing past the cooler during operation of the vehicle to assist the cooling liquid in transferring beat from the engine oil. In this arrangement the oil inlet and outlet passages are integrally formed in the crankcase or oil pan walls to eliminate the need for external hose connections and to avoid undesirable thermal affects of the engine on the fluid conductors.

For a better understanding of the invention, its operating advantages and the specific objectives obtained by its use, reference should be made to the accompanying drawings and description which relate to a preferred embodiment thereof.

BRIEF DESCRIPTION OF THE DRAWINGS

FIG. 1 is an elevational view of a motorcycle embodying one form of the present invention;

FIG. 2 is a partial sectional elevational view of the engine of the motorcycle of FIG. 1;

FIG. 3 is a sectional elevational view illustrating the oil cooler of FIG. 2 in greater detail;

FIG. 4 is a somewhat schematic representation of the lubricating oil flow system of the motorcycle of FIG. 1;

FIG. 5 illustrates a modified form of the present invention in which the oil cooler is mounted on the engine crankcase;

FIG. 6 is an elevational view of a motorcycle embodying another form of the present invention;

DESCRIPTION OF THE PREFERRED EMBODIMENTS OF THE INVENTION

Figure 8:
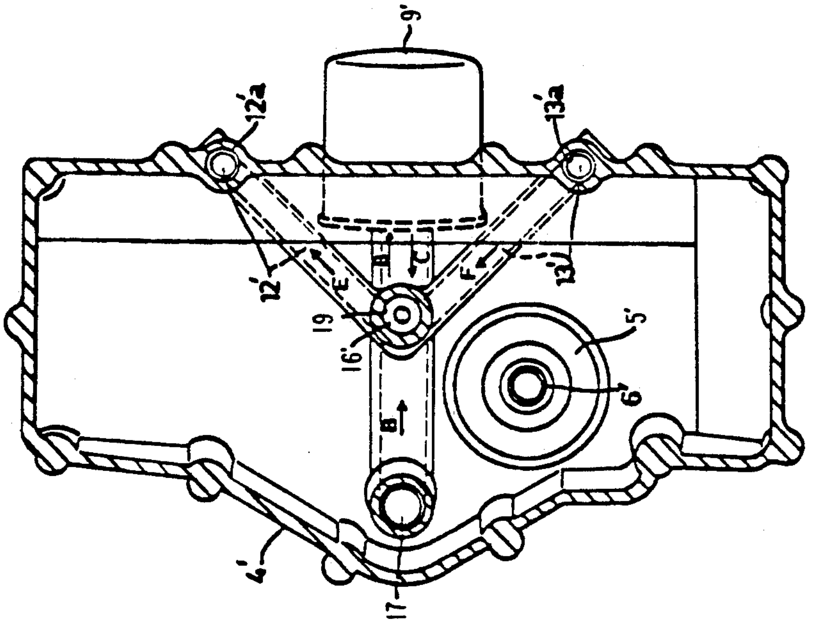
FIG. 8 is a sectional view taken along line III—III of FIG. 7.
Figure 7:
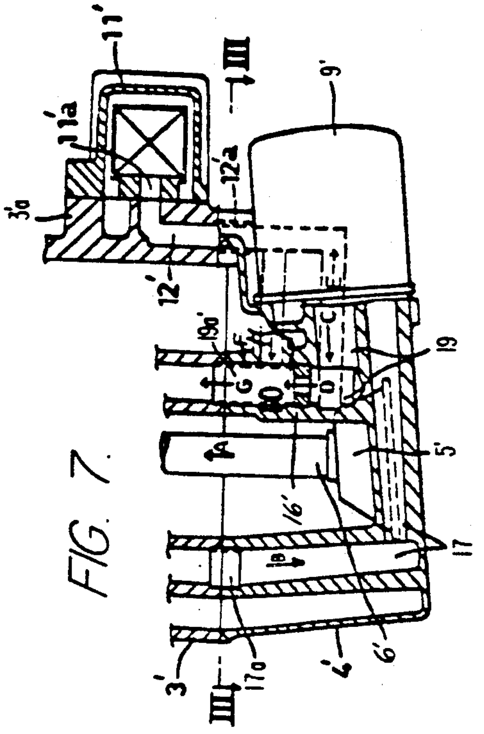
FIG. 7 is a partial sectional elevational view illustrating the oil cooling system employed in the embodiment of FIG. 6.

Referring to FIGS. 1 to 3, reference numerals indicate at 1 an engine, at 2 a crankcase, and at 3 an oil pan mounted on a lower surface of the crankcase 2. In the oil pan 3 is formed an oil storing portion 4; or sump, in which an oil strainer 5 is provided submerged in a body of engine oil. The oil strainer 5 is connected to an oil pump 7 provided in the crankcase 2 through the intermediary of a suction pipe 6 connected to the oil strainer 5. The engine oil, which is pumped by the oil pump 7 from the sump 4 through the oil strainer 5 through the intermediary of the suction pipe 6, is fed under pressure to a first flow passage 8 connecting to the exhaust side of the oil pump 7. The first flow passage 8 extends downwardly and leads to the oil pan 3 through the intermediary of a first pipe joint 8*a*. An oil filter 9 is provided on the outer front surface of the oil pan 3 to communicate with the latter and is adapted to filter impurities in the engine oil flowing from the first flow passage 8. Further, the outlet side of the oil filter communicates with a second flow passage 10 formed in the oil pan 3 and is adapted to feed the filtered engine oil to the second flow passage 10.

The crankcase 2 is adapted to mount an oil cooler 11 by the provision of bosses 23 and 24 on its outer front surface to space the cooler forwardly of the crankcase surface and define a gap 25 therebetween for the circulation of air around all surfaces of the cooler. Inside the crankcase 2 are a cooler inlet passage 12 and a cooler outlet passage 13 that are mutually parallel and that communicate with the oil cooler 11. The inlet passage 12 opens to a mounting surface on the oil cooler 11 at a downsteam end thereof and is adapted to conduct engine oil entering the second flow passage 10 to the oil cooler 11 by the fact that the upstream end of the inlet passage 12 is branched from the latter extending from the oil pan 3 into the crankcase 2 through the intermediary of a second pipe joint 10*a*. The outlet passage 13 opens to the mounting surface of the oil cooler 11 at its upstream end, similar to the inlet passage 12, and communicates with a main gallery 14 at its downstream end, whereby the outlet passage 13 is adapted to supply engine oil from the oil cooler 11 to each of the engine parts to be lubricated through the intermediary of the main gallery 14. Also, the downstream side of the second flow passage 10 is further extended from the branching portion of the inlet passage 12 and forms a bypass flow passage 15 which is connected to a communicating portion between the outlet passage 13 and the main gallery 14 so as to communicate the inlet passage 12 with the outlet passage 13. The flow rate of oil to be bypassed can be varied by fitting an appropriate orifice 16 into the bypass flow passage 15. The range of bypass flow can be varied from the one extreme at which all the engine oil from the second flow passage 10 flows directly to the main gallery 14 to the other extreme at which all of the engine oil flows through the oil cooler 11.

The oil cooler 11 has a generally circular shape and is mounted on the outer front surface of the crankcase 2. It comprises an interior heat transfer element 17 and an exterior housing 18 covering the element 17. Between the element 17 and housing 18 is formed a water passage 19. On the upper end of the housing 18 are provided a water inlet 18*a* and a water outlet 18*b* to which cooling water is conducted from the engine radiator (not shown) whereby heat is transferred from the engine oil flowing in the element 17 to the cooling water so that the oil is consequently cooled. Also, between the housing 18 and the mounting surface of the crankcase 2 is provided a base plate 20 that forms one face of the housing 18. In the base plate 20 are provided openings 20*a* and 20*b* into which the inlet port 17*a* and the outlet port 17*b* from the passages 12 and 13, respectively, are fitted via a welded connection. The ports 17*a* and 17*b* project symmetrically in an up and down relationship approximately at the center of the element 17. When the oil cooler 11 is mounted on the crankcase 2, the inlet port 17*a* and the outlet port 17*b* communicate with openings aligned with the inlet passage 12 and the outlet passage 13 provided in the mounting surface of the oil cooler 11 of the crankcase 2, whereby the oil cooler 11 is mounted in a liquid-tight manner on the crankcase 2 through the intermediary of O-rings 21. Further, in a multicylinder engine, as indicated in FIG. 5, exhaust pipes may be oppositely offset in the left and right directions to permit positioning of the oil cooler 11 therebetween. In this arrangement, the oil cooler 11 is, as shown, formed with a circular shape, but it may alternatively be provided with a rectangular shape.

In operation, engine oil stored in the oil pan 3, after lubricating the various parts of the engine to be lubricated, is pumped by the oil pump 7 which is driven by the engine crankshaft through the oil strainer 5 and fed under pressure to the oil filter 9 via the first flow passage 8. After being filtered by the oil filter 9, the engine oil is conducted to the oil cooler 11 via the second flow passage 10 and the inlet passage 12 and is cooled by cooling water conducted through the oil cooler 11. The engine oil is then supplied from the outlet passage 13 to the main gallery 14 and, thence, to each of the engine parts to be lubricated.

In a situation in which the engine oil and the cooling water are at a low temperature, as, for example, when the engine is started in cold regions, the viscosity of the oil and, thereby, its resistance to flow is increased. When comparing the main flow passage side having the element 17, the inlet flow passage 12 and the outlet passage 13 with the bypass flow passage 15 side having the orifice 16, the fluid frictional resistance becomes greater at the main flow passage side than the bypass flow passage 15 side. The engine oil flows toward the bypass flow passage 15 side and, therefore, flows out directly to the main gallery 14. Accordingly, when the engine operation has commenced and the engine oil and the cooling water become heated, the viscosity of the oil decreases and the fluid frictional resistance increased at the bypass flow passage 15 side as compared with the main flow passage, whereby the engine oil flows toward the main flow passage side so as to undergo normal circulation.

Also, since in the described arrangement the element 17 provided inside the oil cooler 11 is welded to the base plate 20 mounting the housing 18, there is no loosening of the element due to engine vibration or to vibrations incurred in driving so that oil leakage into the cooling water is prevented.

Figure 9:
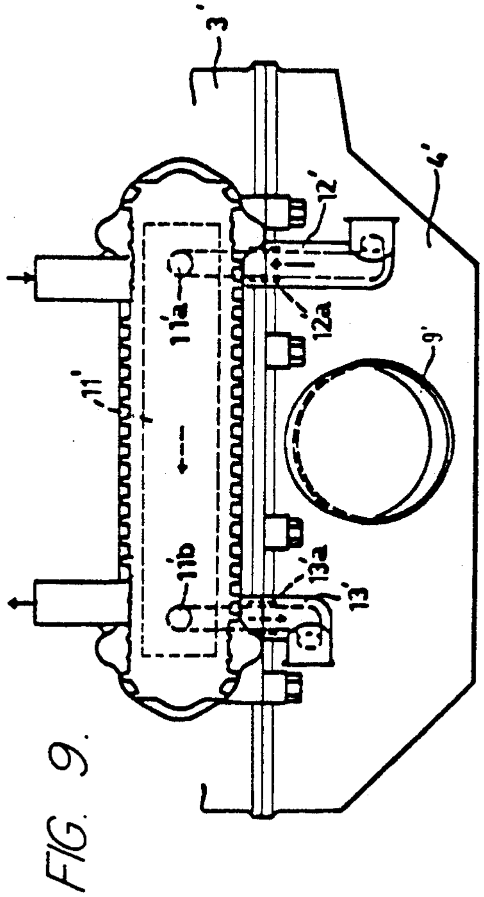
FIG. 9 is a partial front elevational view of the engine and oil cooler of FIG. 6.

Referring to FIGS. 6 to 9, reference numeral 1' indicates a motorcycle, 2' an engine, 2" a radiator, 3' a crankcase, and at 4' an oil pan mounted on the lower surface of the crankcase 3'. In the bottom portion of the oil pan 4' is formed an oil storage portion 4". An oil strainer 5' is provided in the storage portion 4" for immersion into the engine oil. The engine oil is pumped in the direction of arrow "A" from the oil strainer 5' through the intermediary of a pipe 6' by means of an oil pump (not shown). The pumped engine oil is fed under pressure in the direction of arrow "B", through a first flow passage 17 connecting to the exhaust side of the oil pump. The first flow passage 17 extends downwardly and leads into the oil pan 4' through the intermediary of a first pipe joint 17*a*. Also, the first flow passage 17 communicates with a filter 9' mounted on the front outer surface of the oil pan 4' so as to filter impurities from the engine oil flowing in the first flow passage 17. Further, the exhaust side of the oil filter 9' communicates with a second flow passage 19 formed in the oil pan 4' so as to conduct the filtered engine oil into the second flow passage 19 where it flows in the direction of arrow "C". The upstream side of the second flow passage 19 is caused to extend upwardly by being offset and leads into the crankcase 3' through the intermediary of a second pipe joint 19*a*. The passage is then connected to a main gallery in the crankcase 3' for supplying engine oil to each of the respective engine parts to be lubricated. In the second flow passage 19 is fitted an orifice 16' adapted to press against the second pipe joint 19*a*. The inlet passage 12' and outlet passage 13' communicate with the oil cooler 11' mounted outside the crankcase 3' as shown in FIGS. 8 and 9, where the passages are depicted as converging with the orifice 16' being positioned at the apex. In this way, the flow rate of the engine oil conducted into the second flow passage 19 can be adjusted by varying the diameter of the orifice 16' from a case in which the engine oil is conducted directly to the main gallery in the direction of arrow "D" to a case in which all of the engine oil is conducted through the oil cooler 11', as indicated by arrow "E".

Both of the aforesaid passages 12' and 13' extend divergently from the second flow passage 19 in the horizontal direction in a V-shape, as shown in FIG. 8, and lead to the front outer wall of the oil pan 4'. The passages 12' and 13' are caused to extend upwardly by being offset in the outer wall and pass into the front outer wall of the crankcase 3' through the intermediary of third pipe joints 12'a and 13'a. To communicate with the oil cooler 11', upper portions of the passages 12' and 13' are formed integrally with the crankcase, and lower portions of the passages 12' and 13' are formed integrally with the oil pan 4' together with the second flow passage 19. In this way, the passages 12' and 13' are disposed such that engine oil conducted to the oil cooler 11' enters the second flow passage into the inlet passage 12' from the downstream side of the orifice 16' in the direction of arrow "E", whereupon it is cooled by cooling water from the radiator 2. The engine oil, after being cooled in the cooler 11', flows into the outlet passage 13' in the direction of arrow "F", and is conducted from the upstream side of the orifice 16' to the main gallery in the direction of arrow "G".

The described oil cooler 11' is generally rectangular in shape and is adapted to be mounted horizontally on a crankcase mounting portion 3'a formed in the front outer wall of the crankcase 3'. The mounting portion 3'a has end portions of the passage 12' and 13' formed therein and is so arranged that an inlet port 11'a and an outlet port 11'b provided in the oil cooler 11' communicate with the passages 12' and 13', respectively.

According to the described embodiment, the flowing air which drives against the front surface of the crankcase 3' and of the oil pan 4' upon operation of the motorcycle, extracts beat from the crankcase 3', or the like. Particularly, the front outer wall of the crankcase 3' and the oil pan 4' are remarkably cooled, as compared with the remainder of the structure, such that the engine oil flowing through the passages 12' and 13' is cooled through the intermediary of the heat transfer from the crankcase 3', or the like. Further, by utilizing the front outer wall of the crankcase or of the oil pan 4', for containing both the passages 12' and 13' the need for separate pipes or rubber hoses is avoided.

Also, because the engine oil is at a low temperature when the engine is started in cold regions, its viscosity is increased. Accordingly, the fluid frictional resistance in the case where the engine oil passes the oil cooler becomes greater than that in the case that it passes the orifice 16', whereby the oil flows to the orifice 16' in the direction of arrow "D", and flows directly to the main gallery. On the other hand, when the engine warms up after starting, the viscosity of the engine oil decreases, and the converse of the aforementioned occurs, i.e., the oil flows to the oil cooler 11' in the direction of arrow "E", whereby normal cooling in the oil cooler is performed. Thus, by forming the bypass passage provided with the orifice 16' at the inlet passage 12' and the outlet passage 13', the load on the oil pump can be reduced without damaging the cooling performance of the oil cooler 11'. By passing the cooling water in the oil cooler 11' mounted on the wall surface of the crankcase 3', the vibrations of the engine 2' are absorbed and the noise thereof is reduced.

As mentioned above, according the the present invention, by providing the orifice so as to bypass the oil cooler, even if the engine oil and the cooling water is at a low temperature, the engine oil can be supplied to each of the lubricating portions and the cooling performance of the oil cooler is not damaged in normal driving. Also, by selectively varying the diameter of the orifice, the cooling performance of the oil cooler can be voluntarily changed. Further, the described apparatus has the desirable effect that it is simple in its structure and has no movable parts so that the potential for malfunction is reduced.

Also, according to the alternative form of the present invention, since the inlet and the outlet passages for-the engine oil, that connect with the oil cooler, are formed integrally in the front outer wall of the crankcase or of the oil pan, it is possible to improve the durability of the oil conducting pipes and to reduce the number of required parts. Moreover, by employing air flow to cool the engine oil flowing through the passage, the thermal load on the oil cooler is reduced.

It should be further understood that, although preferred embodiments of the invention have been illustrated and described herein, changes and modifications can be made in the described arrangements without departing from the scope of the appended claims.

We claim:

1. An air and water cooled oil cooler system comprising:

a motorcycle having an engine including a crankcase and an oil pan;

an oil filter mounted on the lower front portion of the engine;

an air and water cooled oil cooler mounted on the front of the engine downstream along the oil flow path from said oil filter and in mutually spaced non-obstructing relation to said oil filter, whereby the flowing air drives against and cools both the oil filter and the oil cooler; and a radiator, capable of supplying engine cooling water to said oil cooler for cooling oil, disposed adjacent to the front upper portion of the engine and in mutually spaced, non-obstructing relation to said oil cooler, whereby the flowing air drives against and cools both the radiator and the oil cooler.

2. The air and water cooled oil cooler system according to claim 1 in which said oil cooler occupies the space extending from a lower portion of the engine to an upper portion of the oil pan, the surface of said oil pan being substantially unobstructed by the oil cooler, whereby the flowing air drives against and cools both the oil cooler and the exposed surface of the oil pan.

3. An air and water cooled oil cooler system comprising:

a motorcycle having an engine including a crankcase and an oil pan;

an oil filter mounted on a lower portion of the engine;

an oil cooler mounting boss disposed on a front portion of the engine;

an air and water cooled oil cooler mounted downstream along the oil flow path from said oil filter and in mutually spaced, non-obstructing relation to said oil filter, and fixed to said mounting boss which defines a gap between said oil cooler and the front portion of the engine for circulation of air around said oil cooler, whereby the flowing air drives against and cools both the oil filter and the oil cooler; and a radiator, capable of supplying engine cooling water to said oil cooler for cooling oil, disposed adjacent to the front upper portion of the engine and in mutually spaced non-obstructing relation to said oil cooler, whereby the flowing air drives against and cools both the radiator and the oil cooler.

4. The air and water cooled oil cooler system according to claim 3 in which said oil cooler occupies the space extending from a lower portion of the engine to an upper portion of the oil pan, the surface of said oil pan being substantially unobstructed by the oil cooler, whereby the flowing air drives against and cools both the oil cooler and the exposed surface of the oil pan.

* * * * *